United States Patent
Ganick et al.

(10) Patent No.: US 10,240,732 B1
(45) Date of Patent: Mar. 26, 2019

(54) CONTROL DEVICE AND RELATED USER INTERFACES AND TECHNIQUES FOR CONTROLLING SOLID-STATE LIGHTING DEVICE EMISSIONS

(71) Applicant: Ledvance LLC, Wilmington, MA (US)

(72) Inventors: Aaron Ganick, Boxford, MA (US); Shiyong Zhang, Boxborough, MA (US); Scott Kelly, Manchester, NH (US)

( * ) Notice: Subject to any disclaimer, the term of this patent is extended or adjusted under 35 U.S.C. 154(b) by 0 days.

(21) Appl. No.: 15/707,125

(22) Filed: Sep. 18, 2017

(51) Int. Cl.
| | |
|---|---|
| *F21S 8/04* | (2006.01) |
| *F21V 21/14* | (2006.01) |
| *F21V 23/00* | (2015.01) |
| *H05B 33/08* | (2006.01) |

(52) U.S. Cl.
CPC .............. *F21S 8/046* (2013.01); *F21V 21/14* (2013.01); *F21V 23/003* (2013.01); *H05B 33/0815* (2013.01); *H05B 33/0824* (2013.01); *H05B 33/0854* (2013.01); *H05B 33/0866* (2013.01)

(58) Field of Classification Search
CPC ........................ H05B 37/0272; H05B 37/0263; H05B 37/02; H05B 37/029; H05B 33/0863; G01J 3/40; G01J 2005/608; H04W 4/00; H04W 4/02; H04W 4/12; H04W 4/16; H04W 4/90; G06F 3/0482; G06F 3/04817
See application file for complete search history.

(56) References Cited

U.S. PATENT DOCUMENTS

| | | | |
|---|---|---|---|
| 9,497,836 B2 | 11/2016 | Vangeel et al. | |
| 9,516,729 B2 | 12/2016 | Zhang et al. | |
| 9,572,235 B2 * | 2/2017 | Ogawa | H05B 37/0272 |
| 9,900,957 B2 * | 2/2018 | van de Ven | H05B 33/0872 |
| 9,961,731 B2 * | 5/2018 | Reed | F21V 9/20 |

FOREIGN PATENT DOCUMENTS

CN 103934222 A 7/2014

OTHER PUBLICATIONS

Osram Lightify smart lighting kit user manual and instructions https://www.osram.com/osram_com/press/press-releases/_trade_press/2014/intelligent-light-fromosram-simple,-individual-and-colorful/index.jsp.
Franz Dugand, "Bluetooth Smart and ZigBee: If you can't beat them, join them" , Published on Sep. 21, 2015 , http://embedded-computing.com/articles/bluetooth-smart-and-zigbee-if-youcant-beat-them-join-them. Website contents captured on Dec. 7, 2016 attached as reference 3.

* cited by examiner

Primary Examiner — Haissa Philogene
(74) Attorney, Agent, or Firm — Hayes Soloway (57) ABSTRACT

A control device and related user interfaces (UIs) and techniques for controlling the light output of a solid-state lighting device are disclosed. In accordance with some embodiments, the control device may be configured to present a UI having one or more adjustment features operatively associated with one or more adjustment modes by which the control device may control the light output of a downstream lighting device communicatively coupled with the control device. Via a given adjustment feature, a user (or other controller) may adjust one or more characteristics, such as intensity, correlated color temperature (CCT), and color of the emissions of the lighting device. In some embodiments, the control device may be a computing device, mobile or otherwise, and the UI may be presented by a display element as a graphical UI (GUI).

57 Claims, 6 Drawing Sheets

(Prior Art)

CONTROL DEVICE AND RELATED USER INTERFACES AND TECHNIQUES FOR CONTROLLING SOLID-STATE LIGHTING DEVICE EMISSIONS

FIELD OF THE DISCLOSURE

The present disclosure relates to solid-state lighting and more particularly to control devices and user interfaces to control emissions of solid-state lighting devices.

BACKGROUND

Modern solid-state lighting devices can be controlled using wireless computing devices, such as smartphones. Typically, a smartphone may host an application (colloquially known as an app) that provides a graphical user interface through which a user may control the output of a modern solid-state lighting device communicatively coupled with the wireless computing device. Through such an app, the user may provide input which causes the downstream lighting device to adjust its emissions.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

A control device and related user interfaces (UIs) and techniques for controlling the light output of a solid-state lighting device are disclosed. In accordance with some embodiments, the control device may be configured to present a UI having one or more adjustment features operatively associated with one or more adjustment modes by which the control device may control the light output of a downstream lighting device communicatively coupled with the control device. Via a given adjustment feature, a user (or other controller) may adjust one or more characteristics, such as intensity, correlated color temperature (CCT), and color of the emissions of the lighting device. In some embodiments, the control device may be a computing device, mobile or otherwise, and the UI may be presented by a display element as a graphical UI (GUI). Numerous configurations and variations will be apparent in light of this disclosure.

General Overview

Figure 1A:
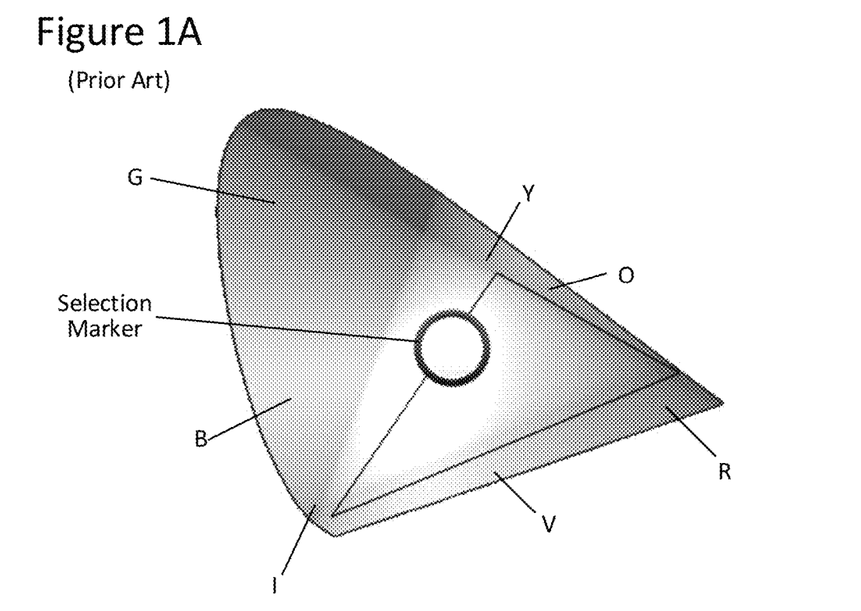
FIG. 1A illustrates the standard CIE 1931 XY chromaticity space.

FIG. 1A illustrates the standard CIE 1931 XY chromaticity space. This color chart uses specific color ordinance values x,y or u', v' which, although they may be familiar to various scientific and engineering communities, unfortunately have little meaning to typical end-users and the average consumer. Moreover, within the color chart of FIG. 1A, it is difficult to select a precise color using one's finger or even some styluses.

Figure 1B:
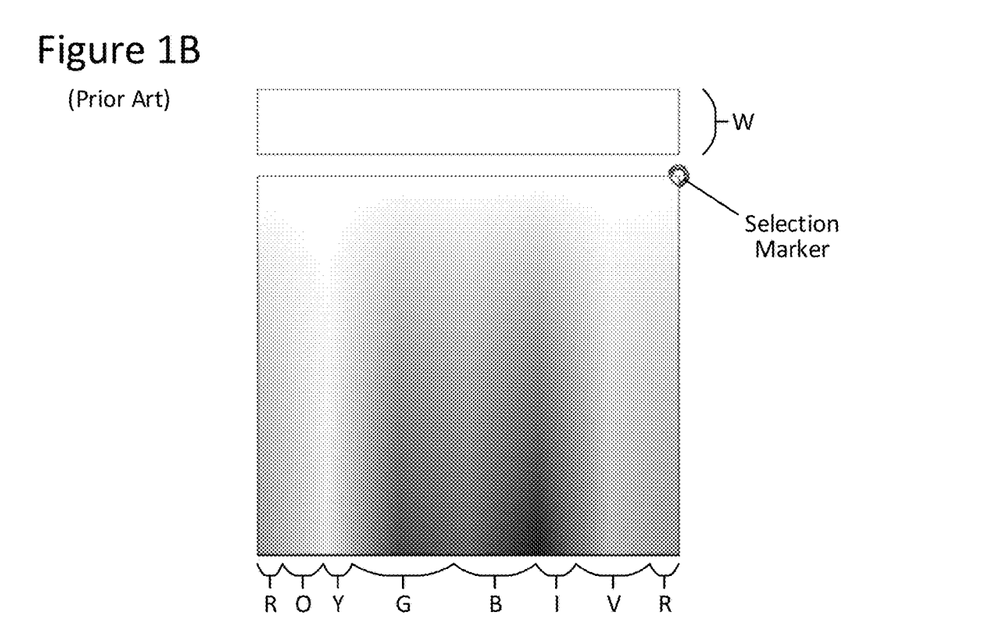
FIGS. 1B-1C illustrate several existing rectangular color-selection charts utilized in some example computing device user interfaces.
Figure 1C:
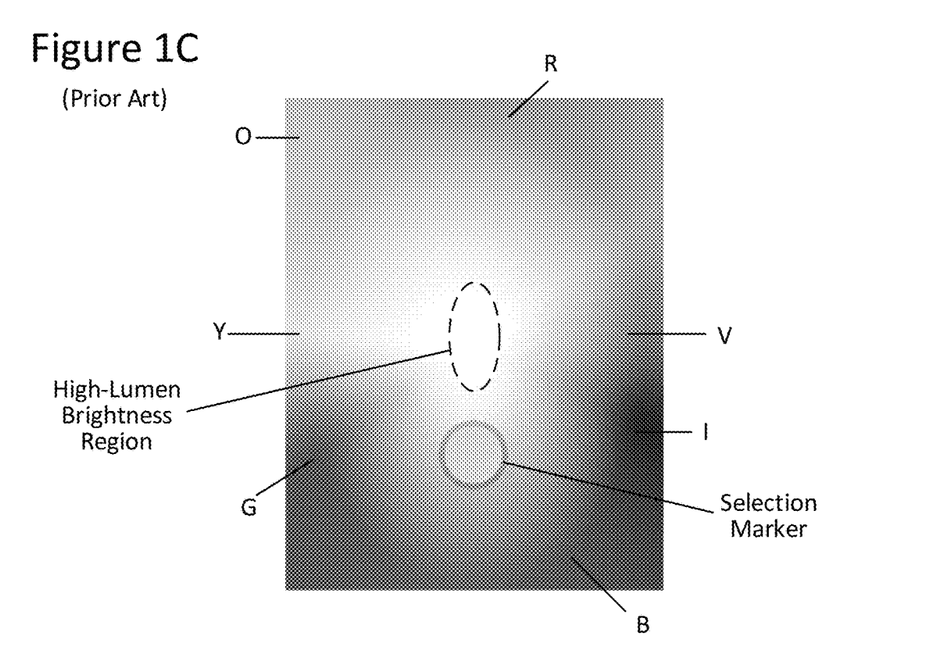
Figure 1D:
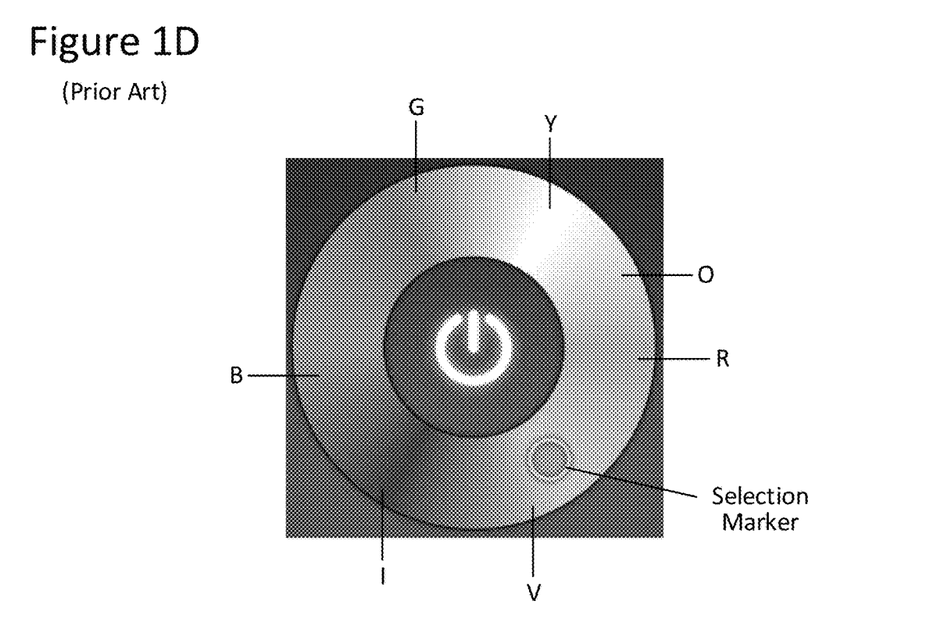
FIG. 1D illustrates an existing circular color-selection chart utilized in an example computing device user interface.

FIGS. 1B-1C illustrate several existing rectangular color-selection charts utilized in some example computing device user interfaces. FIG. 1D illustrates an existing circular color-selection chart utilized in an example computing device user interface. As can be seen from FIGS. 1B-1D, the colors are densely packed and are not organized in any especially harmonized or aesthetic manner. Consequently, some end-users have reported being dizzied or overwhelmed by these and other similar color charts. Also, as with the CIE color space of FIG. 1A, it is difficult to select a precise color using one's finger or even some styluses with color charts of the types in FIGS. 1B-1D. Additionally, in the color-selection chart of FIG. 1C, there is a high-lumen brightness region directly in the center of the color space that is not conducive to precise color selection. Furthermore, with the color-selection chart of FIG. 1D, the end-user tends to use a finger to slide around the disk to select a desired color. This, however, produces a large amount of wireless data traffic that can lead to lamp and system performance issues, including crashes. Moreover, following the data traffic, the lamp receiving such input can change color quickly, which can be quite visually disturbing to bystanders.

Thus, and in accordance with some embodiments of the present disclosure, a control device and related user interfaces (UIs) and techniques for controlling the light output of a solid-state lighting device are disclosed. In accordance with some embodiments, the control device may be configured to present a UI having one or more adjustment features operatively associated with one or more adjustment modes by which the control device may control the light output of a downstream lighting device communicatively coupled with the control device. Via a given adjustment feature, a user (or other controller) may adjust one or more characteristics, such as intensity, correlated color temperature (CCT), and color of the emissions of the lighting device. In some embodiments, the control device may be a computing device, mobile or otherwise, and the UI may be presented by a display element as a graphical UI (GUI).

In some embodiments, the disclosed UI may be implemented, for example, in an application-based form suitable for use on a computing device, mobile or otherwise. In some embodiments, the disclosed UI may be implemented, for example, in a webpage-based form suitable for use in a web browser on a computing device, mobile or otherwise. In some embodiments, the disclosed UI may be implemented, for example, in a form suitable for use in a lighting control console (e.g., a lighting board or a lighting desk). As will be appreciated in light of this disclosure, a given UI provided as variously described herein may be provided via physical control features, virtual control features, or a combination thereof.

It should be noted that although the disclosed control device is generally discussed herein in the example context of being a computing device, mobile or otherwise, and therefore the UIs may be displayed as graphical UIs (GUIs), the present disclosure is not intended to be so limited. For instance, in some cases, the UI may be implemented, for example, with control devices (e.g., physical, electronic, etc.) other than computing devices. In a more general sense, and in accordance with some embodiments, a UI configured as variously provided herein may be embodied in hardware, software, or some combination thereof, and the host control device may be customized, as desired for a given target application or end-use.

In at least some cases, the disclosed control device may provide a UI that is generally aesthetic, having a clean visual layout that allows for precise control over light output while also being user-friendly. Moreover, the disclosed control device may be compatible for use with lighting devices and platforms, both existing and after-developed, including smart devices and platforms, and may not require any change to hardware or firmware of any of the various elements along the control/communication pathway (e.g., solid-state lamp, wireless communications gateway, cloud/network elements, or computing device).

In accordance with some embodiments, the disclosed control device may be configured to output a given control signal to a downstream lighting device, for instance, to adjust its output only after selection and adjustment of a given emissions characteristic is made by a user (or other controller). In this manner, there may be less wired or wireless data traffic, and the lighting device receiving the input may avoid sporadic changes in its output, reducing visual disturbance to onlookers, and reduce the opportunity for system crashes.

System Architecture and Operation

Figure 2:
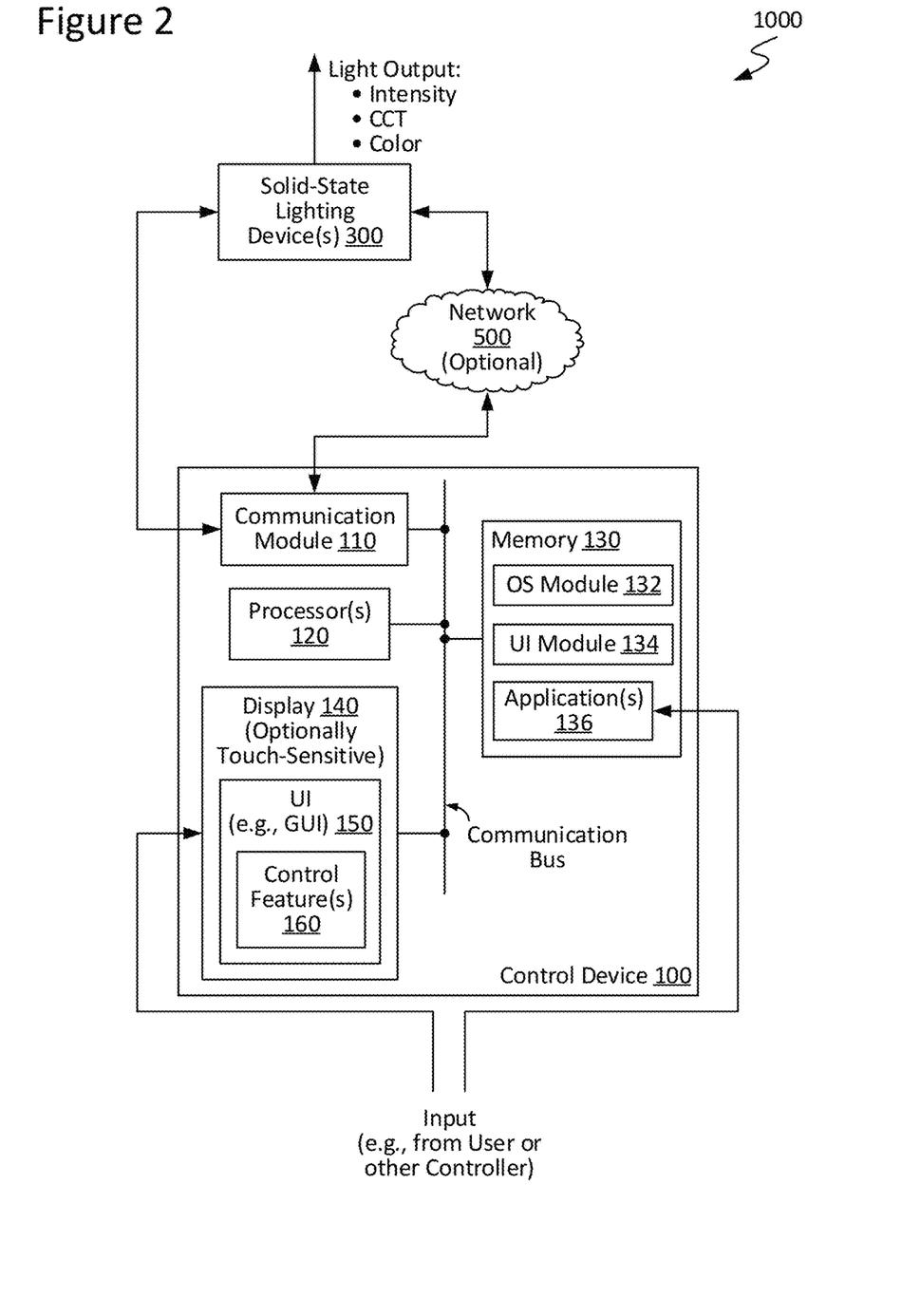
FIG. 2 is a block diagram illustrating an example lighting system configured in accordance with an embodiment of the present disclosure.

FIG. 2 is a block diagram illustrating an example lighting system 1000 configured in accordance with an embodiment of the present disclosure. As can be seen, system 1000 may include a control device 100 (discussed below in detail) and one or more solid-state lighting devices 300. A given lighting device 300 may be an individual or plurality of solid-state emitters, a lamp or luminaire including solid-state emitter(s), or any other solid-state lighting element, as will be apparent in light of this disclosure. In accordance with some embodiments, a given lighting device 300 may be a solid-state lighting device, configured for wired and/or wireless communication, and optionally may be a smart solid-state lighting device.

Communication between any or all elements of system 1000 may be provided via any one or combination of suitable wired and wireless communications means, as will be apparent in light of this disclosure. In some cases, control device 100 may be configured to be directly communicatively coupled with a lighting device 300. In some other cases, however, control device 100 may be configured to communicate indirectly through an intervening or otherwise intermediate network 500 (optional) for facilitating the transfer of data between control device 100 and lighting device 300. Network 500 may be any suitable communications network and, at least in some cases, may include supporting infrastructure and/or functionalities, such as a server and a service provider, but such features are not necessary to carry out communication via network 500.

In accordance with some embodiments, control device 100 may be configured to output a control signal to a downstream lighting device 300 with which it is communicatively coupled, directly or indirectly, to control the light output thereof. More specifically, control device 100 may be configured, in accordance with some embodiments, to provide for electronic adjustment of any one or combination of light emissions characteristics of lighting device 300, including the intensity (e.g., brightness/dimness), correlated color temperature (CCT), and color of light emitted. In some cases, control device 100 may be a computing device, mobile or otherwise, such as a smartphone or a tablet computer, to name a few options. In some other cases, however, control device 100 may be a dedicated control device (e.g., such as a remote control or programming or setup device) associated with a given lighting device 300.

As can be seen from FIG. 2, control device 100 may include a communication module 110, which may be configured to provide communication between control device 100 and either (or both) a lighting device 300 and network 500. To such ends, communication module 110 may be configured for communication utilizing any one, or combination, of suitable wired and/or wireless communication means, such as Universal Serial Bus (USB), Ethernet, FireWire, Wi-Fi, Bluetooth, ZigBee, digital multiplexer (DMX), digital addressable lighting interface (DALI), infrared (IR), IEEE 802.11 wireless local area network (WLAN), and cellular data service, among others. As desired for a given target application or end-use, communication module 110 may be configured as a transmitter, a receiver, or both (i.e., a transceiver). Other suitable configurations for communication module 110 will depend on a given application and will be apparent in light of this disclosure.

Control device 100 also may include one or more processors 120, which may be configured to perform operations associated with control device 100 and any components and modules thereof. In accordance with some embodiments, a given processor 120 may be configured to process or otherwise interpret input (from a user or other source) received, for example, through a user interface (UI) 150 provided at display 140 and/or an application 136 stored in memory 130, each discussed below. As discussed herein, such input may include any one, or combination, of intensity, CCT, and color selection input, among other input, which may be utilized in adjusting the light output of a lighting device 300 communicatively coupled with control device 100. In accordance with some embodiments, a given processor 120 optionally may be configured to process or otherwise interpret input received from either (or both) lighting device 300 and network 500. Other suitable configurations for processor(s) 120 will depend on a given application and will be apparent in light of this disclosure.

Control device 100 further may include memory 130, which may be configured to be utilized, for example, for processor workspace for processor(s) 120 and/or to store media, programs, applications, or other content on control device 100 on a temporary or permanent basis. To such ends, memory 130 may be of any suitable type (e.g., RAM and/or ROM, or other suitable memory) and size, and in some cases, may be implemented with volatile memory, non-volatile memory, or a combination thereof. Other suitable configurations for memory 130 will depend on a given application and will be apparent in light of this disclosure.

Memory 130 may include one or more modules stored therein that can be accessed and executed, for example, by processor(s) 120. For instance, memory 130 may include an operating system (OS) module 132, which may be configured, in accordance with some embodiments, to aid in processing input (e.g., received through UI 150 provided at display 140 and/or an application 136 stored in memory 130). OS module 132 can be implemented with any suitable OS, mobile or otherwise.

Memory 130 may include a user interface (UI) module 134 configured to provide, in part or in whole, a UI 150 (e.g., such as a graphical user interface, or GUI) via display 140, discussed below, or otherwise via control device 100. To that end, UI module 134 may include known, custom, proprietary, or after-developed UI construction code (or instruction sets) that are generally well-defined and operable to present one or more control features 160 via UI 150 for selection and/or manipulation by a user (or other controller). Although FIG. 2 illustrates UI module 134 as being implemented in memory 130, the present disclosure is not intended to be so limited. For instance, in some embodiments, UI module 134 may be implemented in a combination of locations (e.g., memory 130 and display 140), thereby providing a UI module 134 that is, in a general sense, functionally distributed.

Memory 130 also may include one or more applications 136 (colloquially, apps) stored therein, and one or more of such applications 136 may be configured to facilitate presentation and/or operation of UI 134. Other suitable configurations for any of the various modules of memory 130, or control device 100 more generally, will depend on a given application and will be apparent in light of this disclosure.

A given module of control device 100 may be implemented in any one, or combination, of suitable programming languages, such as C, C++, objective C, JavaScript, or custom or proprietary instruction sets, to name a few options. A given module of control device 100 may be encoded, for example, on a machine-readable medium that, when executed by a processor (e.g., such as a processor 120), carries out the desired functionality of that portion of control device 100. The computer-readable medium may be, for example, a hard drive, compact disk, memory stick, server, or any suitable non-transitory computer/computing device memory that includes executable instructions, or a plurality or combination of such memories. Other embodiments may be implemented, for instance, with gate-level logic or an application-specific integrated circuit (ASIC) or chip set or other such purpose-built logic. Some embodiments may be implemented with a microcontroller having input/output capability (e.g., inputs for receiving user inputs; outputs for directing other components) and embedded routine(s) for carrying out a given desired functionality. In a more general sense, the functional module(s) of control device 100 may be implemented in any one, or combination, of hardware, software, and firmware, as desired for a given target application or end-use.

As can be seen from FIG. 2, control device 100 also may include a display 140, which may be configured to display images, video, text, or any other desired content, including any of the elements of a UI 150, as variously described herein. In some cases, display 140 may be integrated with control device 100, whereas in some other cases, it may be a stand-alone component configured to communicate with control device 100 (e.g., via communication module 110) using any suitable wired and/or wireless communications techniques.

In accordance with some embodiments, control device 100 may be configured to receive input via one or more touch-sensitive elements. For instance, in some embodiments, display 140 optionally may be touch-sensitive, in part or in whole. To that end, display 140 may be configured to utilize any one, or combination, of resistive or capacitive touch-sensing, or any other suitable touch-sensing techniques, as will be apparent in light of this disclosure. In some other embodiments, control device 100 additionally or alternatively may include (or otherwise be configured to be communicatively coupled with) a touch-sensitive surface, such as a touch-sensitive track pad. A given optional touch-sensitive element may be configured to detect or otherwise sense direct contact and/or the proximate presence of a user's finger, a stylus, or other suitable touch-sensitive-compatible implement at a given touch-sensitive location (e.g., of display 140 or other element). A given touch-sensitive element may be configured to translate such input into an electronic signal that may be processed by control device 100 (e.g., by a processor 120) and manipulated or otherwise used to trigger a UI 150 action, such as any of those discussed herein.

In accordance with some embodiments, provision of either (or both) a touch-sensitive display 140 and a touch-sensitive surface may assist with the function of UI 150 (e.g., as provided by UI module 134) and the receipt of user or other input by control device 100 (e.g., via display 140 and/or an application 136). In accordance with some embodiments, a touch-sensitive element, such as a touch-sensitive display 140 and/or a touch-sensitive surface, may permit provision of a UI 150 including one or more control features 160 (discussed below) which may be utilized to provide input to control device 100 to be relayed to either (or both) lighting device 300 and network 500.

As previously noted, control device 100 may be configured, in accordance with some embodiments, to display a UI 150 via display 140 or otherwise provide a UI 150 via other suitable portion of control device 100 or remote device operatively coupled with control device 100. A given UI 150 may provide one or more control features 160, which may be utilized by a user (or other controller) to control the operation of any one, or combination, of a lighting device 300, the control device 100, and an intervening network 500. A given control feature 160 may be of any desired configuration. For instance, a given control feature 160 may be provided as a scrollable wheel, a toggle, a button, a switch, a knob, a slider, or a dial, among other actuator options. Moreover, a given control feature 160 may be (or otherwise include) a physical element or a virtual element (e.g., a non-physical, light-based icon associated with a given actuator operation). Selection and manipulation of a given control feature 160 may be made with a user's finger, a stylus, or any other suitable implement, as will be apparent in light of this disclosure.

In accordance with some embodiments, a given control feature 160 provided by UI 150 may be configured to allow selection from and operation of any of the various module(s) and/or application(s) accessible to control device 100 to perform any of a wide variety of operations associated with a lighting device 300 (and optionally either or both control device 100 and network 500). In accordance with some embodiments, a given control feature 160 may be utilized to cause control device 100 to output one or more control signals that may be utilized in controlling the light output of a given lighting device 300, including adjusting any one, or combination, of emissions characteristics, such as intensity, CCT, and color, for example. Additional details of UI(s) 150 are provided below, for instance, with respect to FIGS. 3-5.

Adjustment Modes and Example User Interfaces

In accordance with some embodiments, control device 100 may be configured with one or more adjustment modes by which it may control characteristic(s) of the light output of a given lighting device 300. For a given adjustment mode, any relevant event interpretation codes (e.g., in cases in which control device 100 is a computing device) may be incorporated accordingly to provide for the performance desired for a given target application or end-use of control device 100.

In some embodiments, control device 100 may include an intensity adjustment mode, wherein the intensity (e.g., brightness/dimness) of the light output of a downstream lighting device 300 may be adjusted, as desired. Through intensity adjustment mode, control device 100 may output one or more control signals directly or indirectly (e.g., through a network 500) to a given lighting device 300, in response to which the intensity of the light output of that lighting device 300 may increase or decrease, as desired.

In some embodiments, control device 100 may include a Planck color adjustment mode, wherein the color (e.g., CCT) of the light output of a downstream lighting device 300 may be adjusted, as desired, according to a Planck color scheme. Through Planck color adjustment mode, control device 100 may output one or more control signals directly or indirectly (e.g., through a network 500) to a given lighting device 300, in response to which the color (e.g., CCT) of the light output of that lighting device 300 may change in accordance with a given applied Planck color scheme. As will be appreciated in light of this disclosure, Planck color adjustment mode alternatively may be known as natural color adjustment mode, CCT adjustment mode, or blackbody color adjustment mode, and is not intended to be limited only to the descriptor of Planck color.

In some embodiments, control device 100 may include a true color adjustment mode, wherein the color of the light output of a downstream lighting device 300 may be adjusted, as desired, according to a true color scheme. Through true color adjustment mode, control device 100 may output one or more control signals directly or indirectly (e.g., through a network 500) to a given lighting device 300, in response to which the color of the light output of that lighting device 300 may change in accordance with a given applied true color scheme. As will be appreciated in light of this disclosure, true color adjustment mode alternatively may be known as artificial color adjustment mode, RGB color adjustment mode, or rainbow color adjustment mode, and is not intended to be limited only to the descriptor of true color. Other suitable adjustment mode(s) with which control device 100 may be provided will depend on a given application and will be apparent in light of this disclosure.

As previously indicated, control device 100 may be configured for use in controlling the emissions of a given lighting device 300 with which it is communicatively coupled. To that end, UI 150 may include within its bounds a field of one or more selectable and manipulable control features 160 configured to aid a user (or other controller) in adjusting any one, or combination, of the brightness/dimness, CCT, and color(s) of light emitted by lighting device 300. In some cases where control device 100 includes or otherwise has access to a touch-sensitive element (e.g., a touch-sensitive display 140 and/or a touch-sensitive surface), UI 150 may include one or more virtual control features 160 that a user (or other controller) may manipulate to control the light output of lighting device 300. Utilizing UI 150, a user (or other controller) may enter various commands into control device 100 in a quick and easy manner that results in adjustment of the light emitted by lighting device 300.

UI 150 may have any of a wide range of configurations and, generally, may include a field of selectable control features, elements, icons, or other graphical objects. For instance, consider FIG. 3, which illustrates an example UI 150 provided by a control device 100, in accordance with an embodiment of the present disclosure. As can be seen, in some embodiments, UI 150 may include an intensity adjustment feature 162, a Planck color adjustment feature 164, and a true color adjustment feature 166, each discussed below. As generally shown, any (or all) of features 162, 164, 166 may be provided, for instance, as a scrollable wheel-type control feature, which may be physical, virtual, or a combination thereof. Thus, in accordance with some embodiments, a scroll up or scroll down swiping movement of a given feature 162, 164, 166, with physical contact or proximal presence (e.g., via a gesture), may manipulate that feature 162, 164, 166, resulting in adjustment of a given corresponding emissions characteristic (e.g., intensity, CCT, or color) of one or more downstream lighting devices 300 communicatively coupled with control device 100. Also, as generally shown, all (or some sub-set) of features 162, 164, 166 may be arranged substantially adjacent one another to facilitate selection and operation via a user (or other controller). It should be noted, however, that the arrangement of features 162, 164, 166 may be customized, as desired for a given target application or end-use, and need not be limited only to the example side-by-side arrangement generally illustrated in FIG. 3. In some instances, such as in the case of a UI 150 providing virtual control feature(s) 160, the arrangement of features 162, 164, 166 may be user-configurable on a temporary or permanent basis.

In accordance with some embodiments, intensity adjustment feature 162 may be operatively associated with an intensity adjustment mode of control device 100, as discussed above. Intensity adjustment feature 162 may be configured, in accordance with some embodiments, to adjust the intensity of (e.g., brighten and/or dim) the light output of a lighting device 300 communicatively coupled with control device 100. As feature 162 is manipulated by a user (or other controller), the brightness/dimness of the emissions of lighting device 300 may change accordingly. In accordance with some embodiments, feature 162 may be scrolled in a first direction to increase the intensity of the light output of a downstream lighting device 300. Scrolling feature 162 in a second direction may result in a decrease in intensity. To help convey the present or target intensity level, feature 162 may have one or more markings or indices, such as percentage markers or other desired markers indicative of intensity level. In cases of percentage markers, the percentage increments between demarcations may be provided as desired (e.g., ±1%, ±5%, ±10%, or other percentage). As can be seen from the example embodiment of FIG. 3, feature 162 may include percentage markers ranging from 1-100% (or 0-100%), where 100% corresponds with the full brightness state of the target lighting device 300, and 1% corresponds with a nearly full dimming state. If provided, 0% may correspond with the off state (e.g., full dimming state) of target lighting device 300, for instance.

Figure 3:
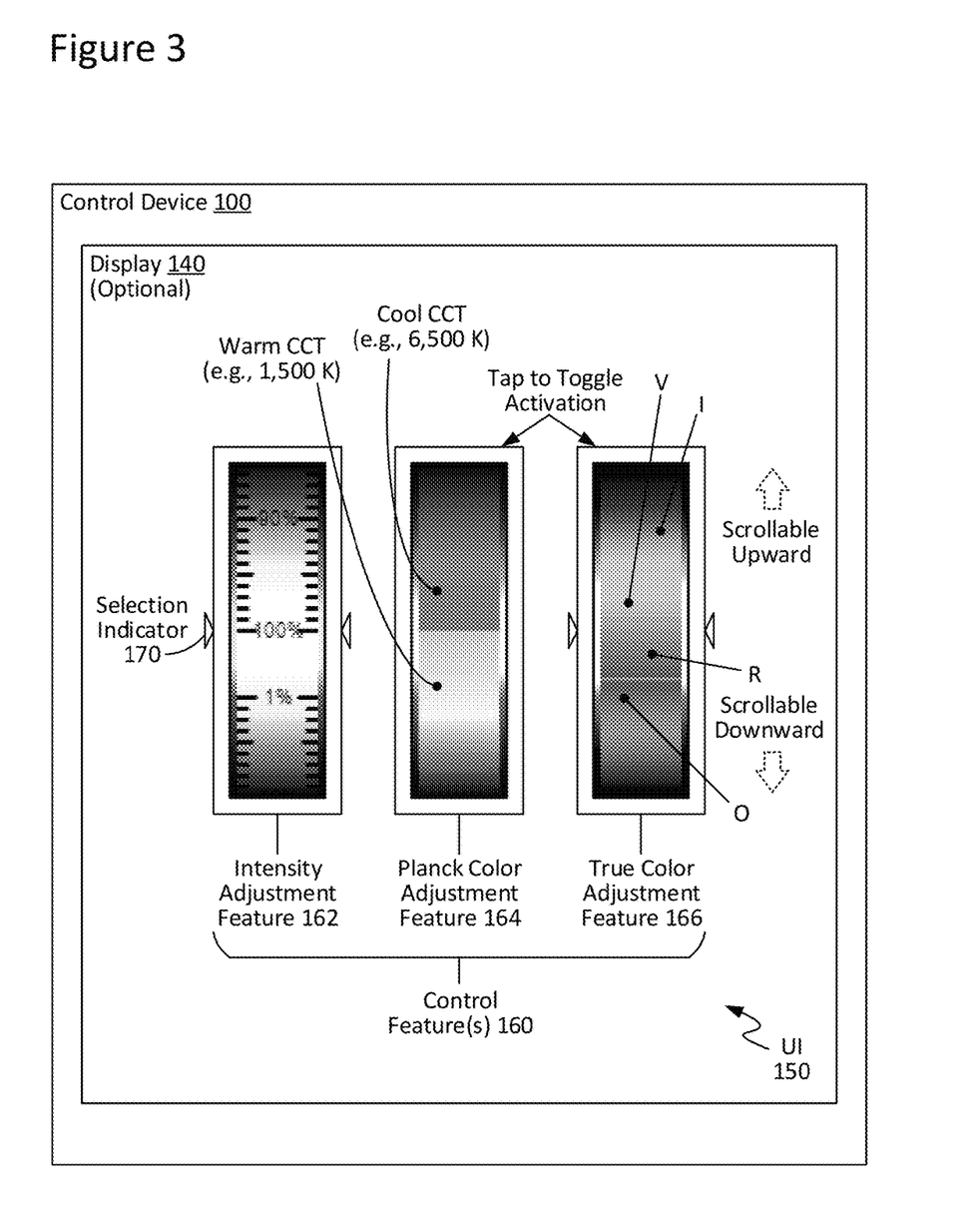
FIG. 3 illustrates an example user interface provided by a control device, in accordance with an embodiment of the present disclosure.

In accordance with some embodiments, Planck color adjustment feature 164 may be operatively associated with a Planck color adjustment mode of control device 100, as discussed above. Planck color adjustment feature 164 may be configured, in accordance with some embodiments, to adjust the CCT of the light output of a lighting device 300 communicatively coupled with control device 100. As feature 164 is manipulated by a user (or other controller), the CCT of the emissions of lighting device 300 may change accordingly. In accordance with some embodiments, feature 164 may be scrolled in a first direction to lower the CCT of the light output of a downstream lighting device 300. Scrolling feature 164 in a second direction may result in raising the CCT. In some embodiments, feature 164 may have an adjustment range from about 1,500-6,500 K, though in other embodiments, other CCT values outside of or within that example range may be provided. The CCT values provided by feature 164 may be presented as a continuous band of CCT color options or as separate bands, delineated as desired. If Planck color adjustment mode is active, then control device 100 optionally may load the last saved Planck color chart to Planck color adjustment feature 164 of UI 150 for manipulation by a user (or other controller).

In some instances, feature 164 may provide CCT selection in a cyclical manner; that is, feature 164 may be scrolled through in a single direction, running through all (or some sub-set) of available CCT selection options and then, at the end of the list, begin again at the beginning of the list, providing a continuously scrollable experience in making a selection. In some other instances, however, feature 164 may provide CCT selection in a non-cyclical manner; that is, feature 164 may be scrolled through in a single direction only until it reaches a designated stopping endpoint at the end of the list, at which point scrolling in the opposite direction would be needed to cycle back through the list, providing a bounded scrollable experience in making a selection.

In accordance with some embodiments, true color adjustment feature 166 may be operatively associated with a true color adjustment mode of control device 100, as discussed above. True color adjustment feature 166 may be configured, in accordance with some embodiments, to adjust the color(s) of the light output of a lighting device 300 communicatively coupled with control device 100. As feature 166 is manipulated by a user (or other controller), the color(s) of the emissions of lighting device 300 may change accordingly. In accordance with some embodiments, feature 166 may be scrolled in a first direction to shift the color(s) of the light output of a downstream lighting device 300 toward a first end of the available output color chart. Scrolling feature 166 in a second direction may result in shifting the color(s) toward a second end of the available output color chart. In some embodiments, feature 166 may have an adjustment range which allows for selection of a visible color (e.g., having a wavelength in the range of about 380-750 nm), though in other embodiments, other colors outside of the visible range may be provided. More generally, the present disclosure is not intended to be limited only to visible colors, as in accordance with some embodiments, colors within other light bands, such as ultraviolet and infrared light, may be provided and adjusted via feature 166 in true color adjustment mode of control device 100. The colors provided by feature 166 may be presented as a continuous band or separate bands, delineated as desired. If true color adjustment mode is active, then control device 100 optionally may load the last saved true color chart to true color adjustment feature 166 of UI 150 for manipulation by a user (or other controller).

In some instances, feature 166 may provide color selection in a cyclical manner; that is, feature 166 may be scrolled through in a single direction, running through all (or some sub-set) of available color selection options and then, at the end of the list, begin again at the beginning of the list, providing a continuously scrollable experience in making a selection. In some other instances, however, feature 166 may provide color selection in a non-cyclical manner; that is, feature 166 may be scrolled through in a single direction only until it reaches a designated stopping endpoint at the end of the list, at which point scrolling in the opposite direction would be needed to cycle back through the list, providing a bounded scrollable experience in making a selection.

As can be seen further from FIG. 3, in accordance with some embodiments, UI 150 also may include one or more selection indicators 170. A given selection indicator 170 may be generally indicative to the user (or other controller) of the present or target selection of intensity, CCT, or color, as the case may be, for a downstream lighting device 300 communicatively coupled with control device 100. The specific configuration and location of a given selection indicator 170, as provided via UI 150, may be customized, as desired for a given target application or end-use.

In some instances, selection indicator(s) 170 optionally may be presented by UI 150 only for currently active adjustment mode(s). For instance, consider FIG. 3, illustrating an example case in which true color adjustment mode is active, and thus true color adjustment feature 166 includes selection indicators 170 presented thereat. Contrariwise, in FIG. 3, Planck color adjustment mode is inactive, and thus Planck color adjustment feature 164 does not include selection indicators 170 presented thereat. Of course, in the opposite case of an active Planck color adjustment mode and an inactive true color adjustment mode, selection indicators 170 instead may be presented at feature 164 and not at feature 166.

In accordance with some embodiments, UI 150 may provide a means for selecting between adjustment modes of control device 100, toggling them between active and inactive states. For example, in some embodiments, a user (or other controller) may tap or otherwise indicate selection of a given feature 162, 164, 166 presented by UI 150, toggling its associated adjustment mode. In the example case of FIG. 3, for instance, true color adjustment mode is currently active, and thus true color adjustment feature 166 is manipulable to effectuate a change in the output of lighting device 300 if manipulated. Contrariwise, in FIG. 3, Planck color adjustment mode is currently inactive, and thus Planck color adjustment feature 164 is not manipulable (or else does not effectuate a change in the output of lighting device 300 even if manipulated). If a user (or other controller) were to tap or otherwise indicate selection of feature 164, Planck color adjustment mode would be toggled on and true color adjustment mode would be toggled off. In this manner, feature 164 then may receive input to effectuate change in the output of a downstream lighting device 300, whereas feature 166 may be permitted no longer to effectuate a change, even if input is (accidentally or intentionally) received thereby. Of course, in the opposite case of an active Planck color adjustment mode and inactive true color adjustment mode, the opposite manipulability and effectuation of light output changes may be provided.

In accordance with some embodiments, UI 150 may provide one or more adjustment features, such as any or all of features 162, 164, 166, that are enabled and manipulable by default, in a temporary or permanent manner. For a given feature 162, 164, 166, defaulting to an active or inactive state may be user-designated or automatic, as desired.

In some embodiments, UI 150 may present a separate feature for selecting between available adjustment modes. For instance, consider FIG. 4, which illustrates an example UI 150 provided by a control device 100, in accordance with another embodiment of the present disclosure. As can be seen here, UI 150 may present a mode selection feature 174 configured to allow for selection between any of the example light adjustment modes of control device 100 discussed herein. As mode selection feature 174 is manipulated, the light adjustment mode of control device 100 may change accordingly. For instance, in the example case of FIG. 4, mode selection feature 174 may be actuated in a first direction to make Planck color adjustment mode active. Actuating feature 174 in a second direction may result in activation of true color adjustment mode. To these ends, the specific configuration of feature 174 may be customized, as desired for a given target application or end-use, and in some cases, may be that of a simple toggle switch.

As generally discussed above with respect to FIGS. 3-4, for example, UI 150 may present any one, or combination, of features 162, 164, 166 as one or more scrollable wheel-type adjustment features. Generally, a given such feature 162, 164, 166 may be configured, in accordance with some embodiments, for cyclic scrolling (e.g., circular scrolling). That is, after swiping, sliding, or otherwise progressing through available adjustment options and reaching either the top or bottom of the list of available options, the content may reload at the bottom or top of the list, as the case may be, to allow for continued cycling through the options. This may provide for a generally continuous scrolling experience, with available options repeating. In accordance with some other embodiments, however, a given feature 162, 164, 166 may be configured for non-cyclic scrolling. That is, after swiping, sliding, or otherwise progressing through available adjustment options and reaching either the top or bottom of the list of available options, the content may not reload at the bottom or top of the list. Instead, the available options may be cycled only in one direction or the other. In accordance with some embodiments, a given feature 162, 164, 166 may be configured for inertial scrolling, where the scrolling motion of that feature continues in a decaying fashion after release of the touch or termination of the gesture or proximate presence, simulating the appearance of an adjustment feature object with inertia.

Figure 5:
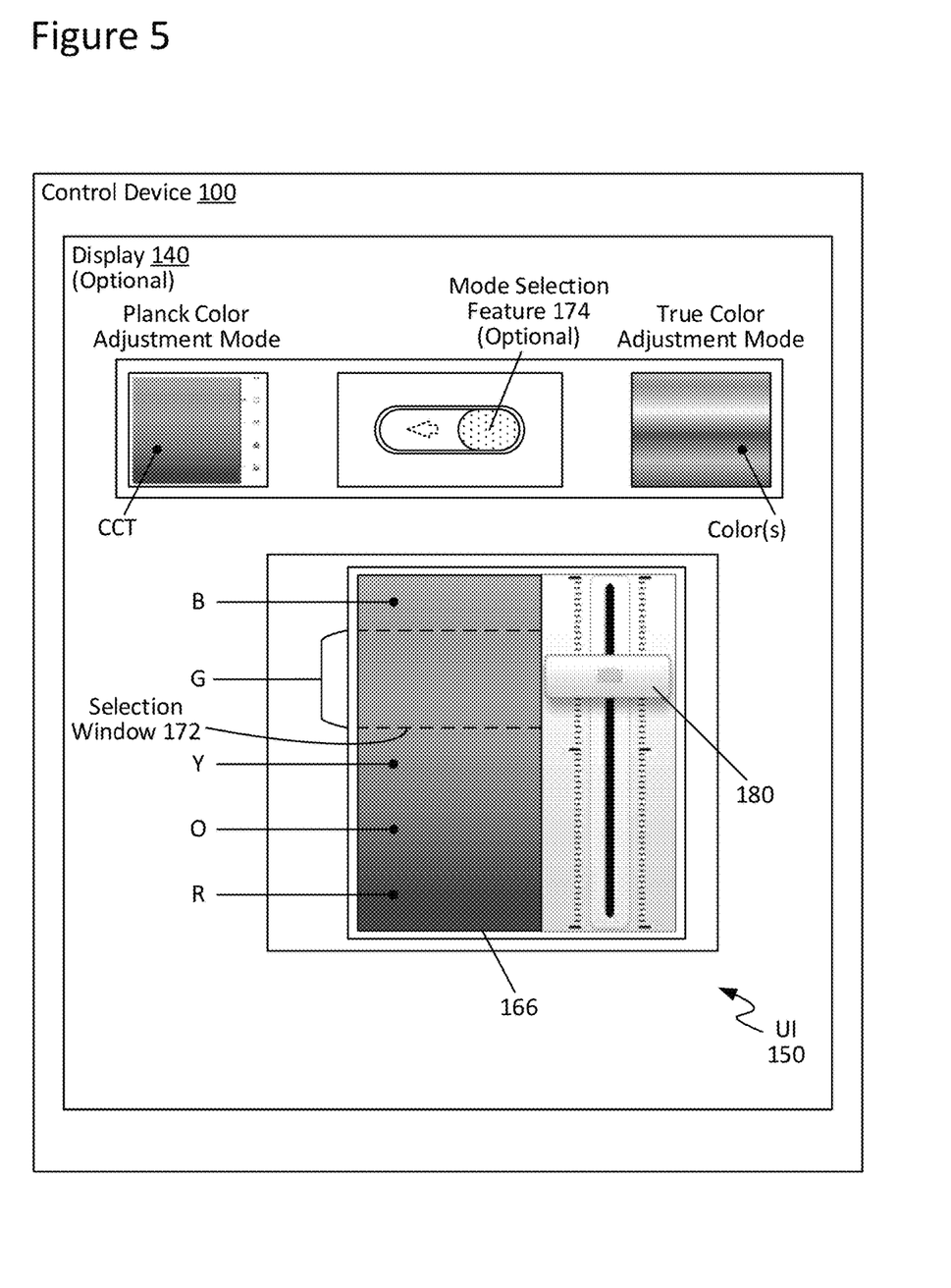
FIG. 5 illustrates an example user interface provided by a control device, in accordance with another embodiment of the present disclosure.

It should be noted, however, that the present disclosure is not intended to be limited only to scrollable wheel-type adjustment features presented by UI 150. For instance, consider FIG. 5, which illustrates an example UI 150 provided by a control device 100, in accordance with another embodiment of the present disclosure. As can be seen here, in some cases, UI 150 may present a slide bar control feature 180, which may be actuated to manipulate a given associated feature 162, 164, 166 to effectuate a change in the output of a downstream lighting device 300. Such a slide bar control feature 180 can be vertical (as generally shown in FIG. 5), horizontal, or in any other desired orientation. As slide bar control feature 180 is moved, selection window 172 may move accordingly. In some instances, the region proximal to (e.g., disposed within) selection window 172 may be expanded as compared to region(s) distal to (e.g., disposed outside of) selection window 172, which may be more compressed. In at least some instances, this may facilitate accurate adjustment and selection of a given listed option to effectuate a change in the light output of a lighting device 300.

For a given adjustment feature 162, 164, 166, whether scrollable wheel-type, slide-bar type, or other, the adjustment increment may be customized, as desired for a given target application or end-use. Moreover, the progression of selections as presented by a given adjustment feature 162, 164, 166 as an element of UI 150 may be linear, logarithmic, exponential, geometric, segmented, or some other desired progression. In a more general sense, the fineness or coarseness of adjustment over the emissions of lighting device 300 may be customized for a given control feature 160, in accordance with some embodiments.

Figure 4:
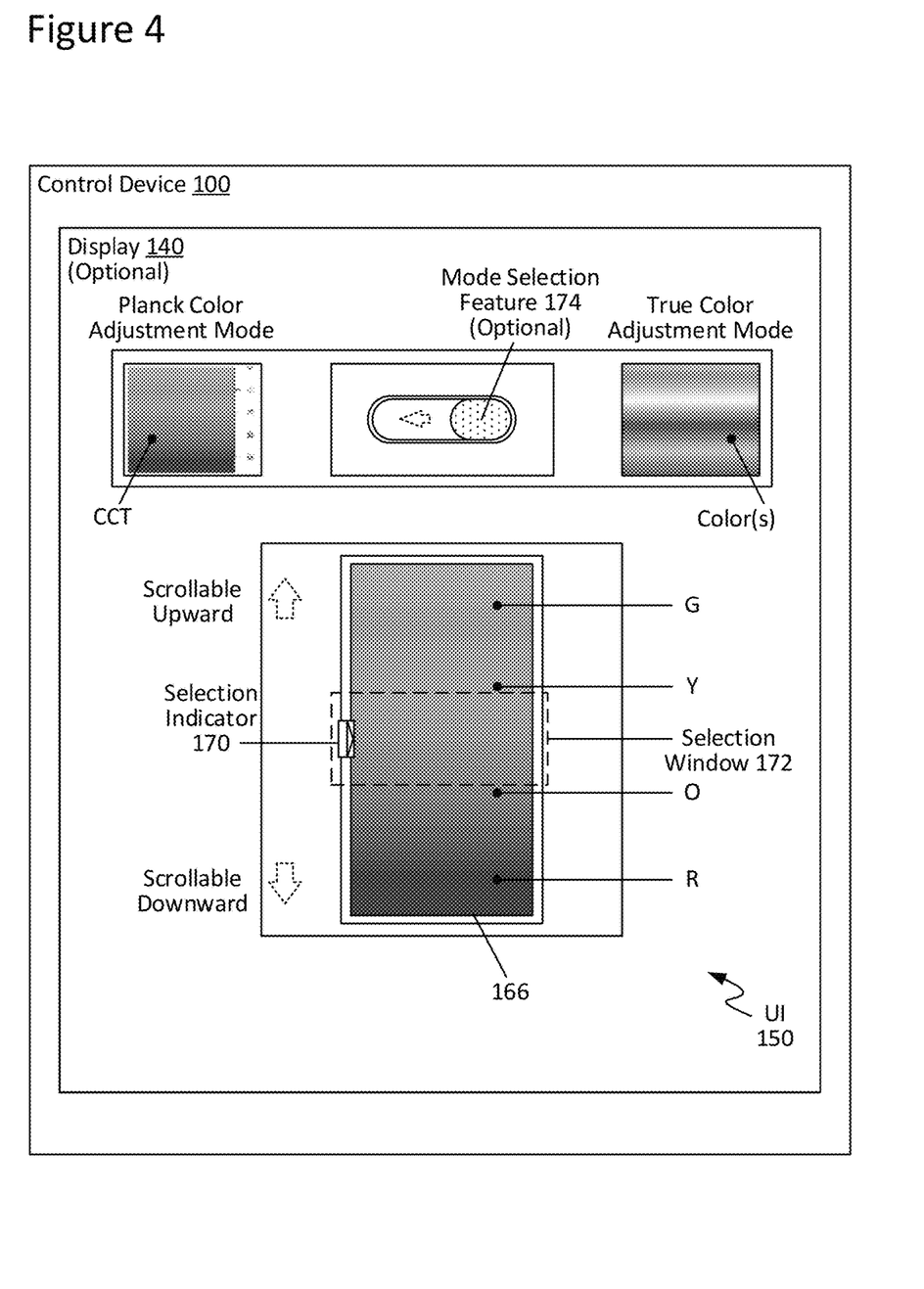
FIG. 4 illustrates an example user interface provided by a control device, in accordance with another embodiment of the present disclosure.

In view of the foregoing, it should be further noted that the present disclosure is not intended to be limited only to the various example UI 150 (e.g., GUI) schemes illustrated and discussed in the context of FIGS. 3-5, as any number of UI schemes and control features, both virtual and physical, in any desired arrangement may be provided by control device 100 to effectuate control over the emissions of a lighting device 300, in accordance with some embodiments. In a more general sense, a given control feature 160 may be associated with any standard, custom, proprietary, or after-defined function, capability, or application of control device 100 and may be customized to meet the preferences of a given user or target application or end-use. Moreover, although the present disclosure generally discusses control device 100 in the context of being an electronic device, such as a computing device, mobile or otherwise, the present disclosure is not intended to be so limited, as in some embodiments, non-electronic and/or non-computing elements may be present for control device 100 as part of UI 150 and contribute to control over the light emissions of a given lighting device 300.

As will be further appreciated in light of this disclosure, although a given FIG. 3, 4, 5 may depict true color adjustment feature 166 with only a few selectable color options immediately visible via UI 150, it is intended that feature 166 may provide for adjustment of any desired range of colors, including any one, or combination, of red (R), orange (O), yellow (Y), green (G), blue (B), indigo (I), and violet (V), for instance. Thus, in some embodiments, all available color adjustment options may be presented in the course of scrolling with feature 166. In some other embodiments, a sub-set of colors may be provided as scrollable options.

In accordance with some embodiments, rather than having two separate scrollable wheel-type adjustment features for Planck color adjustment feature 164 and true color adjustment feature 166, a single scrollable wheel-type feature combining the abilities of both features 164, 166 may be provided. That is, in some cases, options related to both Planck color adjustment mode and true color adjustment mode may be provided via a single adjustment feature presented by UI 150. Thus, as the single adjustment feature is scrolled or otherwise manipulated, options related to true color adjustment mode may follow options related to Planck color adjustment mode (or vice versa). In such cases, an adjustment mode selection feature 174 (discussed above) optionally may be omitted.

In some embodiments, a given feature 162, 164, 166 may be static, in that it does not change its visual appearance or overall layout as it is manipulated. In some other embodiments, however, a given feature 162, 164, 166 may be dynamic, allowing for such changes. For example, the region proximal to (e.g., disposed within) selection window 172 may be expanded as compared to region(s) distal to (e.g., disposed outside of) selection window 172, which may be more compressed. In at least some instances, this may facilitate accurate adjustment and selection of a given element to effectuate a change in the light output of a lighting device 300 communicatively coupled with control device 100.

It should be further noted that the present disclosure is not intended to be limited only to input provided by a user (or other controller) directly to control device 100, as in some cases, an intervening element, such as a peripheral device operatively coupled with control device 100, may be utilized by a user (or other controller) to provide input. For instance, control device 100 may be operatively coupled with a mouse (optionally including a physical scroll wheel), a trackball, a trackpad, or a slider control, among other options, which may be operated to manipulate a given feature 162, 164, 166 to effectuate adjustment of the light output of a downstream lighting device 300.

Numerous embodiments will be apparent in light of this disclosure. One example embodiment provides a non-transitory computer program product encoded with instructions that, when executed by one or more processors, causes a process to be carried out. The computer program product may include one or more computer-readable media, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process includes presenting, via a control device configured to be communicatively coupled with a solid-state lighting device, at least one control feature operatively associated with at least one adjustment mode of the control device by which a light output of the solid-state lighting device can be adjusted, wherein the at least one control feature is: manipulable to cause the control device to transmit a control signal to the solid-state lighting device; and presented as a scrollable wheel-type feature. The process further includes transmitting the control signal, wherein the control signal provides for causing the solid-state lighting device to adjust at least one of an intensity, a correlated color temperature (CCT), and a color of the light output based on a manipulation of the at least one control feature. In some cases, transmitting the control signal occurs only after the manipulation of the at least one control feature has ceased. In some instances, the process further includes: adjusting, via the solid-state lighting device receiving the control signal, at least one of the intensity, the CCT, and the color of the light output based on the manipulation of the at least one control feature of the control device. In some cases: the at least one adjustment mode includes an intensity adjustment mode in which the control signal provides for causing the solid-state lighting device to adjust the intensity of the light output; and the at least one control feature includes an intensity adjustment feature operatively associated with the intensity adjustment mode such that manipulation of the intensity adjustment feature determines whether the control signal provides for causing the solid-state lighting device either to increase or decrease the intensity of the light output. In some instances: the at least one adjustment mode includes a Planck color adjustment mode, in which the control signal provides for causing the solid-state lighting device to adjust the CCT of the light output; and the at least one control feature includes a Planck color adjustment feature operatively associated with the Planck color adjustment mode such that manipulation of the Planck color adjustment feature determines whether the control signal provides for causing the solid-state lighting device either to increase or decrease the CCT of the light output. In some such instances: the control device includes a computing device including memory; and the process further includes presenting, via the Planck color adjustment feature, a CCT color chart last saved by the memory of the control device. In some cases: the at least one adjustment mode includes a true color adjustment mode, in which the control signal provides for causing the solid-state lighting device to adjust the color of the light output; and the at least one control feature includes a true color adjustment feature operatively associated with the true color adjustment mode such that manipulation of the true color adjustment feature determines whether the control signal provides for causing the solid-state lighting device to change a color of the light output. In some such cases: the control device includes a computing device including memory; and the process further includes presenting, via the true color adjustment feature, a true color chart last saved by the memory of the control device. In some instances, the at least one control feature presented as the scrollable wheel-type feature is configured for cyclic scrolling. In some instances, the at least one control feature presented as the scrollable wheel-type feature is configured for non-cyclic scrolling. In some cases, the at least one control feature presented as the scrollable wheel-type feature is dynamic in that a visual appearance thereof, as presented by the control device, changes as the scrollable wheel-type feature is manipulated. In some such cases, in changing the visual appearance of the scrollable wheel-type feature, a region of the scrollable wheel-type feature disposed within bounds of a selection window is expanded in visual presence as compared to a region disposed outside the bounds of the selection window. In some instances, the at least one control feature presented as the scrollable wheel-type feature is static in that a visual appearance thereof, as presented by the control device, does not change as the scrollable wheel-type feature is manipulated. In some cases, the at least one control feature includes: at least one of a Planck color adjustment feature and a true color adjustment feature; and a slide bar control feature configured to control manipulation of the at least one of the Planck color adjustment feature and the true color adjustment feature. In some instances, the process further includes: presenting, via the control device, at least one selection indicator configured to indicate a currently selected option presented by the at least one control feature. In some cases: the at least one adjustment mode includes a plurality of adjustment modes; and a given adjustment mode of the plurality of adjustment modes is toggleable between active and inactive states based on whether the at least one control feature operatively associated with the given adjustment mode is being manipulated. In some instances: the at least one adjustment mode includes a plurality of adjustment modes; and the process further includes presenting, via the control device, an adjustment mode toggling feature operatively associated with the plurality of adjustment modes and configured to toggle a given adjustment mode of the plurality of adjustment modes between active and inactive states based on a manipulation of the adjustment mode toggling feature.

Another example embodiment provides a user interface (UI) on a computing device. The UI includes a field of selectable control features configured such that selection therefrom electronically controls a light output of a solid-state lighting device configured to be communicatively coupled with the computing device. The field of selectable control features includes at least one of: a first control feature operatively associated with an intensity adjustment mode of the computing device by which an intensity of the light output of the solid-state lighting device can be adjusted, wherein the first control feature is manipulable to cause the computing device to output a first control signal to the solid-state lighting device, the first control signal providing for causing the solid-state lighting device to adjust the intensity of the light output; a second control feature operatively associated with a Planck color adjustment mode of the computing device by which a correlated color temperature (CCT) of the light output of the solid-state lighting device can be adjusted, wherein the second control feature is manipulable to cause the computing device to output a second control signal to the solid-state lighting device, the second control signal providing for causing the solid-state lighting device to adjust the CCT of the light output; and a third control feature operatively associated with a true color adjustment mode of the computing device by which a color of the light output of the solid-state lighting device can be adjusted, wherein the third control feature is manipulable to cause the computing device to output a third control signal to the solid-state lighting device, the third control signal providing for causing the solid-state lighting device to adjust the color of the light output; wherein the at least one of the first control feature, the second control feature, and the third control feature is presented as a scrollable wheel-type feature. In some cases, at least one of the intensity adjustment mode, the Planck color adjustment mode, and the true color adjustment mode is toggleable between active and inactive states based on whether the associated at least one of the first control feature, the second control feature, and the third control feature is being manipulated. In some instances, the field of selectable control features further includes an adjustment mode toggling feature: operatively associated with at least one of the intensity adjustment mode, the Planck color adjustment mode, and the true color adjustment mode; and configured to toggle the at least one of the intensity adjustment mode, the Planck color adjustment mode, and the true color adjustment mode between active and inactive states based on a manipulation of the adjustment mode toggling feature. In some cases, the computing device is configured to output at least one of the first control signal, the second control signal, and the third control signal only after manipulation of the associated at least one of the first control feature, the second control feature, and the third control feature has ceased. In some instances, the computing device at least one of: includes a touch-sensitive display configured to display the field of selectable control features as one or more light-based icons; and is configured to be communicatively coupled with a touch-sensitive display configured to display the field of selectable control features as one or more light-based icons.

Another example embodiment provides a control device configured to be communicatively coupled with a solid-state lighting device. The control device includes at least one of: a first control feature operatively associated with a Planck color adjustment mode of the control device by which a correlated color temperature (CCT) of a light output of the solid-state lighting device can be adjusted, wherein the first control feature is manipulable to cause the control device to output a first control signal to the solid-state lighting device, the first control signal providing for causing the solid-state lighting device to adjust the CCT of the light output; and a second control feature operatively associated with a true color adjustment mode of the control device by which a color of the light output of the solid-state lighting device can be adjusted, wherein the second control feature is manipulable to cause the control device to output a second control signal to the solid-state lighting device, the second control signal providing for causing the solid-state lighting device to adjust the color of the light output; wherein at least one of the first control feature and the second control feature is presented as a scrollable wheel-type feature. In some cases, the control device further includes a third control feature operatively associated with an intensity adjustment mode of the control device by which an intensity of the light output of the solid-state lighting device can be adjusted, wherein the third control feature is manipulable to cause the control device to output a third control signal to the solid-state lighting device, the third control signal providing for causing the solid-state lighting device to adjust the intensity of the light output, and wherein the third control feature is presented as a scrollable wheel-type feature. In some such cases: the control device includes each of the first control feature, the second control feature, and the third control feature; and each of the first control feature, the second control feature, and the third control feature is presented as a scrollable wheel-type feature. In some instances, at least one of the Planck color adjustment mode and the true color adjustment mode is toggleable between active and inactive states based on whether the associated at least one of the first control feature and the second control feature is being manipulated. In some cases, the control device further includes an adjustment mode toggling feature: operatively associated with at least one of the Planck color adjustment mode and the true color adjustment mode; and configured to toggle the at least one of the Planck color adjustment mode and the true color adjustment mode between active and inactive states based on a manipulation of the adjustment mode toggling feature. In some instances, the control device is further configured to output at least one of the first control signal and the second control signal only after manipulation of the associated at least one of the first control feature and the second control feature has ceased. In some cases, at least one of the first control feature and the second control feature is provided by the control device as a physical feature. In some cases, at least one of the first control feature and the second control feature is provided by the control device as a virtual feature. In some instances, the control device: includes a computing device; and at least one of: further includes a touch-sensitive display configured to present thereat at least one of the first control feature and the second control feature as a light-based icon; and is further configured to be communicatively coupled with a touch-sensitive display configured to present thereat at least one of the first control feature and the second control feature as a light-based icon.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A non-transitory computer program product encoded with instructions that, when executed by one or more processors, causes a process to be carried out, the process comprising:

presenting, via a control device configured to be communicatively coupled with a solid-state lighting device, at least one control feature operatively associated with at least one adjustment mode of the control device by which a light output of the solid-state lighting device is adjusted, wherein the at least one control feature is:
manipulable to cause the control device to transmit a control signal to the solid-state lighting device; and
presented as a scrollable wheel-type feature that is dynamic in that a visual appearance thereof, as presented by the control device, changes as the scrollable wheel-type feature is manipulated; and
transmitting the control signal, wherein the control signal provides for causing the solid-state lighting device to adjust at least one of an intensity, a correlated color temperature (CCT), and a color of the light output based on a manipulation of the at least one control feature.

2. The non-transitory computer program product of claim 1, wherein transmitting the control signal occurs only after the manipulation of the at least one control feature has ceased.

3. The non-transitory computer program product of claim 1, wherein the process further comprises:
adjusting, via the solid-state lighting device receiving the control signal, at least one of the intensity, the CCT, and the color of the light output based on the manipulation of the at least one control feature of the control device.

4. The non-transitory computer program product of claim 1, wherein:
the at least one adjustment mode comprises an intensity adjustment mode in which the control signal provides for causing the solid-state lighting device to adjust the intensity of the light output; and
the at least one control feature comprises an intensity adjustment feature operatively associated with the intensity adjustment mode such that manipulation of the intensity adjustment feature determines whether the control signal provides for causing the solid-state lighting device either to increase or decrease the intensity of the light output.

5. The non-transitory computer program product of claim 1, wherein:
the at least one adjustment mode comprises a Planck color adjustment mode, in which the control signal provides for causing the solid-state lighting device to adjust the CCT of the light output; and
the at least one control feature comprises a Planck color adjustment feature operatively associated with the Planck color adjustment mode such that manipulation of the Planck color adjustment feature determines whether the control signal provides for causing the solid-state lighting device either to increase or decrease the CCT of the light output.

6. The non-transitory computer program product of claim 5, wherein:
the control device comprises a computing device comprising memory; and
the process further comprises:
presenting, via the Planck color adjustment feature, a CCT color chart last saved by the memory of the control device.

7. The non-transitory computer program product of claim 1, wherein:
the at least one adjustment mode comprises a true color adjustment mode, in which the control signal provides for causing the solid-state lighting device to adjust the color of the light output; and
the at least one control feature comprises a true color adjustment feature operatively associated with the true color adjustment mode such that manipulation of the true color adjustment feature determines whether the control signal provides for causing the solid-state lighting device to change a color of the light output.

8. The non-transitory computer program product of claim 7, wherein:
the control device comprises a computing device comprising memory; and
the process further comprises:
presenting, via the true color adjustment feature, a true color chart last saved by the memory of the control device.

9. The non-transitory computer program product of claim 1, wherein the at least one control feature presented as the scrollable wheel-type feature is configured for cyclic scrolling.

10. The non-transitory computer program product of claim 1, wherein the at least one control feature presented as the scrollable wheel-type feature is configured for non-cyclic scrolling.

11. The non-transitory computer program product of claim 1, wherein:
the at least one adjustment mode comprises a plurality of adjustment modes; and
a given adjustment mode of the plurality of adjustment modes is toggleable between active and inactive states based on whether the at least one control feature operatively associated with the given adjustment mode is being manipulated.

12. The non-transitory computer program product of claim 1, wherein in changing the visual appearance of the scrollable wheel-type feature, a region of the scrollable wheel-type feature disposed within bounds of a selection window is expanded in visual presence as compared to a region disposed outside the bounds of the selection window.

13. The non-transitory computer program product of claim 1, wherein:
the at least one adjustment mode comprises a plurality of adjustment modes; and
the process further comprises:
presenting, via the control device, an adjustment mode toggling feature operatively associated with the plurality of adjustment modes and configured to toggle a given adjustment mode of the plurality of adjustment modes between active and inactive states based on a manipulation of the adjustment mode toggling feature.

14. The non-transitory computer program product of claim 1, wherein the at least one control feature comprises:
at least one of a Planck color adjustment feature and a true color adjustment feature; and
a slide bar control feature configured to control manipulation of the at least one of the Planck color adjustment feature and the true color adjustment feature.

15. The non-transitory computer program product of claim 1, wherein the process further comprises:
presenting, via the control device, at least one selection indicator configured to indicate a currently selected option presented by the at least one control feature.

16. A user interface (UI) on a computing device, the UI comprising:
a field of selectable control features configured such that selection therefrom electronically controls a light output of a solid-state lighting device configured to be communicatively coupled with the computing device, the field of selectable control features comprising at least one of:
a first control feature operatively associated with an intensity adjustment mode of the computing device by which an intensity of the light output of the solid-state lighting device is adjusted, wherein the first control feature is manipulable to cause the computing device to output a first control signal to the solid-state lighting device, the first control signal providing for causing the solid-state lighting device to adjust the intensity of the light output;

a second control feature operatively associated with a Planck color adjustment mode of the computing device by which a correlated color temperature (CCT) of the light output of the solid-state lighting device is adjusted, wherein the second control feature is manipulable to cause the computing device to output a second control signal to the solid-state lighting device, the second control signal providing for causing the solid-state lighting device to adjust the CCT of the light output; and a third control feature operatively associated with a true color adjustment mode of the computing device by which a color of the light output of the solid-state lighting device is adjusted, wherein the third control feature is manipulable to cause the computing device to output a third control signal to the solid-state lighting device, the third control signal providing for causing the solid-state lighting device to adjust the color of the light output;

wherein the at least one of the first control feature, the second control feature, and the third control feature is presented as a scrollable wheel-type feature that is dynamic in that a visual appearance thereof, as presented by the UI, changes as the scrollable wheel-type feature is manipulated.

17. The UI of claim 16, wherein the computing device is configured to output at least one of the first control signal, the second control signal, and the third control signal only after manipulation of the associated at least one of the first control feature, the second control feature, and the third control feature has ceased.

18. The UI of claim 16, wherein the computing device at least one of:
comprises a touch-sensitive display configured to display the field of selectable control features as one or more light-based icons; and
is configured to be communicatively coupled with a touch-sensitive display configured to display the field of selectable control features as one or more light-based icons.

19. The UI of claim 16, wherein at least one of the intensity adjustment mode, the Planck color adjustment mode, and the true color adjustment mode is toggleable between active and inactive states based on whether the associated at least one of the first control feature, the second control feature, and the third control feature is being manipulated.

20. The UI of claim 16, wherein the field of selectable control features further comprises an adjustment mode toggling feature:
operatively associated with at least one of the intensity adjustment mode, the Planck color adjustment mode, and the true color adjustment mode; and
configured to toggle the at least one of the intensity adjustment mode, the Planck color adjustment mode, and the true color adjustment mode between active and inactive states based on a manipulation of the adjustment mode toggling feature.

21. A control device configured to be communicatively coupled with a solid-state lighting device, the control device comprising at least one of:
a first control feature operatively associated with a Planck color adjustment mode of the control device by which a correlated color temperature (CCT) of a light output of the solid-state lighting device is adjusted, wherein the first control feature is manipulable to cause the control device to output a first control signal to the solid-state lighting device, the first control signal providing for causing the solid-state lighting device to adjust the CCT of the light output; and a second control feature operatively associated with a true color adjustment mode of the control device by which a color of the light output of the solid-state lighting device is adjusted, wherein the second control feature is manipulable to cause the control device to output a second control signal to the solid-state lighting device, the second control signal providing for causing the solid-state lighting device to adjust the color of the light output;

wherein at least one of the first control feature and the second control feature is presented as a scrollable wheel-type feature that is dynamic in that a visual appearance thereof, as presented by the control device, changes as the scrollable wheel-type feature is manipulated.

22. The control device of claim 21, wherein at least one of the first control feature and the second control feature is provided by the control device as a virtual feature.

23. The control device of claim 21, wherein the control device:
comprises a computing device; and
at least one of:
further comprises a touch-sensitive display configured to present thereat at least one of the first control feature and the second control feature as a light-based icon; and
is further configured to be communicatively coupled with a touch-sensitive display configured to present thereat at least one of the first control feature and the second control feature as a light-based icon.

24. The control device of claim 21, further comprising a third control feature operatively associated with an intensity adjustment mode of the control device by which an intensity of the light output of the solid-state lighting device is adjusted, wherein the third control feature is manipulable to cause the control device to output a third control signal to the solid-state lighting device, the third control signal providing for causing the solid-state lighting device to adjust the intensity of the light output, and wherein the third control feature is presented as a scrollable wheel-type feature.

25. The control device of claim 24, wherein:
the control device comprises each of the first control feature, the second control feature, and the third control feature; and
each of the first control feature, the second control feature, and the third control feature is presented as a scrollable wheel-type feature.

26. The control device of claim 21, wherein at least one of the Planck color adjustment mode and the true color adjustment mode is toggleable between active and inactive states based on whether the associated at least one of the first control feature and the second control feature is being manipulated.

27. The control device of claim 21, wherein the control device further comprises an adjustment mode toggling feature:
operatively associated with at least one of the Planck color adjustment mode and the true color adjustment mode; and
configured to toggle the at least one of the Planck color adjustment mode and the true color adjustment mode between active and inactive states based on a manipulation of the adjustment mode toggling feature.

28. The control device of claim 21, wherein the control device is further configured to output at least one of the first control signal and the second control signal only after manipulation of the associated at least one of the first control feature and the second control feature has ceased.

29. The control device of claim 21, wherein at least one of the first control feature and the second control feature is provided by the control device as a physical feature.

30. A non-transitory computer program product encoded with instructions that, when executed by one or more processors, causes a process to be carried out, the process comprising:
 presenting, via a control device configured to be communicatively coupled with a solid-state lighting device, at least one control feature operatively associated with at least one adjustment mode of the control device by which a light output of the solid-state lighting device is adjusted, wherein the at least one control feature is:
  manipulable to cause the control device to transmit a control signal to the solid-state lighting device; and
  presented as a scrollable wheel-type feature that is static in that a visual appearance thereof, as presented by the control device, does not change as the scrollable wheel-type feature is manipulated; and
 transmitting the control signal, wherein the control signal provides for causing the solid-state lighting device to adjust at least one of an intensity, a correlated color temperature (CCT), and a color of the light output based on a manipulation of the at least one control feature.

31. The non-transitory computer program product of claim 30, wherein:
 the at least one adjustment mode comprises a plurality of adjustment modes; and
 a given adjustment mode of the plurality of adjustment modes is toggleable between active and inactive states based on whether the at least one control feature operatively associated with the given adjustment mode is being manipulated.

32. The non-transitory computer program product of claim 30, wherein:
 the at least one adjustment mode comprises a plurality of adjustment modes; and
 the process further comprises:
  presenting, via the control device, an adjustment mode toggling feature operatively associated with the plurality of adjustment modes and configured to toggle a given adjustment mode of the plurality of adjustment modes between active and inactive states based on a manipulation of the adjustment mode toggling feature.

33. The non-transitory computer program product of claim 30,
 wherein transmitting the control signal occurs only after the manipulation of the at least one control feature has ceased.

34. The non-transitory computer program product of claim 30, wherein the process further comprises:
 adjusting, via the solid-state lighting device receiving the control signal, at least one of the intensity, the CCT, and the color of the light output based on the manipulation of the at least one control feature of the control device.

35. The non-transitory computer program product of claim 30, wherein:
 the at least one adjustment mode comprises an intensity adjustment mode in which the control signal provides for causing the solid-state lighting device to adjust the intensity of the light output; and
 the at least one control feature comprises an intensity adjustment feature operatively associated with the intensity adjustment mode such that manipulation of the intensity adjustment feature determines whether the control signal provides for causing the solid-state lighting device either to increase or decrease the intensity of the light output.

36. The non-transitory computer program product of claim 30, wherein:
 the at least one adjustment mode comprises a Planck color adjustment mode, in which the control signal provides for causing the solid-state lighting device to adjust the CCT of the light output; and
 the at least one control feature comprises a Planck color adjustment feature operatively associated with the Planck color adjustment mode such that manipulation of the Planck color adjustment feature determines whether the control signal provides for causing the solid-state lighting device either to increase or decrease the CCT of the light output.

37. The non-transitory computer program product of claim 36, wherein:
 the control device comprises a computing device comprising memory; and
 the process further comprises:
  presenting, via the Planck color adjustment feature, a CCT color chart last saved by the memory of the control device.

38. The non-transitory computer program product of claim 30, wherein:
 the at least one adjustment mode comprises a true color adjustment mode, in which the control signal provides for causing the solid-state lighting device to adjust the color of the light output; and
 the at least one control feature comprises a true color adjustment feature operatively associated with the true color adjustment mode such that manipulation of the true color adjustment feature determines whether the control signal provides for causing the solid-state lighting device to change a color of the light output.

39. The non-transitory computer program product of claim 38, wherein:
 the control device comprises a computing device comprising memory; and
 the process further comprises:
  presenting, via the true color adjustment feature, a true color chart last saved by the memory of the control device.

40. The non-transitory computer program product of claim 30, wherein the at least one control feature presented as the scrollable wheel-type feature is configured for cyclic scrolling.

41. The non-transitory computer program product of claim 30, wherein the at least one control feature presented as the scrollable wheel-type feature is configured for non-cyclic scrolling.

42. The non-transitory computer program product of claim 30, wherein the at least one control feature comprises:
 at least one of a Planck color adjustment feature and a true color adjustment feature; and
 a slide bar control feature configured to control manipulation of the at least one of the Planck color adjustment feature and the true color adjustment feature.

43. The non-transitory computer program product of claim 30, wherein the process further comprises:

presenting, via the control device, at least one selection indicator configured to indicate a currently selected option presented by the at least one control feature.

44. A user interface (UI) on a computing device, the UI comprising:
a field of selectable control features configured such that selection therefrom electronically controls a light output of a solid-state lighting device configured to be communicatively coupled with the computing device, the field of selectable control features comprising at least one of:
a first control feature operatively associated with an intensity adjustment mode of the computing device by which an intensity of the light output of the solid-state lighting device is adjusted, wherein the first control feature is manipulable to cause the computing device to output a first control signal to the solid-state lighting device, the first control signal providing for causing the solid-state lighting device to adjust the intensity of the light output;
a second control feature operatively associated with a Planck color adjustment mode of the computing device by which a correlated color temperature (CCT) of the light output of the solid-state lighting device is adjusted, wherein the second control feature is manipulable to cause the computing device to output a second control signal to the solid-state lighting device, the second control signal providing for causing the solid-state lighting device to adjust the CCT of the light output; and
a third control feature operatively associated with a true color adjustment mode of the computing device by which a color of the light output of the solid-state lighting device is adjusted, wherein the third control feature is manipulable to cause the computing device to output a third control signal to the solid-state lighting device, the third control signal providing for causing the solid-state lighting device to adjust the color of the light output;
wherein the at least one of the first control feature, the second control feature, and the third control feature is presented as a scrollable wheel-type feature that is static in that a visual appearance thereof, as presented by the UI, does not change as the scrollable wheel-type feature is manipulated.

45. The UI of claim 44, wherein the computing device is configured to output at least one of the first control signal, the second control signal, and the third control signal only after manipulation of the associated at least one of the first control feature, the second control feature, and the third control feature has ceased.

46. The UI of claim 44, wherein the computing device at least one of:
comprises a touch-sensitive display configured to display the field of selectable control features as one or more light-based icons; and
is configured to be communicatively coupled with a touch-sensitive display configured to display the field of selectable control features as one or more light-based icons.

47. The UI of claim 44, wherein at least one of the intensity adjustment mode, the Planck color adjustment mode, and the true color adjustment mode is toggleable between active and inactive states based on whether the associated at least one of the first control feature, the second control feature, and the third control feature is being manipulated.

48. The UI of claim 44, wherein the field of selectable control features further comprises an adjustment mode toggling feature:
operatively associated with at least one of the intensity adjustment mode, the Planck color adjustment mode, and the true color adjustment mode; and
configured to toggle the at least one of the intensity adjustment mode, the Planck color adjustment mode, and the true color adjustment mode between active and inactive states based on a manipulation of the adjustment mode toggling feature.

49. A control device configured to be communicatively coupled with a solid-state lighting device, the control device comprising at least one of:
a first control feature operatively associated with a Planck color adjustment mode of the control device by which a correlated color temperature (CCT) of a light output of the solid-state lighting device is adjusted, wherein the first control feature is manipulable to cause the control device to output a first control signal to the solid-state lighting device, the first control signal providing for causing the solid-state lighting device to adjust the CCT of the light output; and
a second control feature operatively associated with a true color adjustment mode of the control device by which a color of the light output of the solid-state lighting device is adjusted, wherein the second control feature is manipulable to cause the control device to output a second control signal to the solid-state lighting device, the second control signal providing for causing the solid-state lighting device to adjust the color of the light output;
wherein at least one of the first control feature and the second control feature is presented as a scrollable wheel-type feature that is static in that a visual appearance thereof, as presented by the control device, does not change as the scrollable wheel-type feature is manipulated.

50. The control device of claim 49, wherein at least one of the first control feature and the second control feature is provided by the control device as a virtual feature.

51. The control device of claim 49, wherein the control device:
comprises a computing device; and
at least one of:
further comprises a touch-sensitive display configured to present thereat at least one of the first control feature and the second control feature as a light-based icon; and
is further configured to be communicatively coupled with a touch-sensitive display configured to present thereat at least one of the first control feature and the second control feature as a light-based icon.

52. The control device of claim 49, further comprising a third control feature operatively associated with an intensity adjustment mode of the control device by which an intensity of the light output of the solid-state lighting device is adjusted, wherein the third control feature is manipulable to cause the control device to output a third control signal to the solid-state lighting device, the third control signal providing for causing the solid-state lighting device to adjust the intensity of the light output, and wherein the third control feature is presented as a scrollable wheel-type feature.

53. The control device of claim 52, wherein:
the control device comprises each of the first control feature, the second control feature, and the third control feature; and each of the first control feature, the second control feature, and the third control feature is presented as a scrollable wheel-type feature.

54. The control device of claim 49, wherein at least one of the Planck color adjustment mode and the true color adjustment mode is toggleable between active and inactive states based on whether the associated at least one of the first control feature and the second control feature is being manipulated.

55. The control device of claim 49, wherein the control device further comprises an adjustment mode toggling feature:
   operatively associated with at least one of the Planck color adjustment mode and the true color adjustment mode; and
   configured to toggle the at least one of the Planck color adjustment mode and the true color adjustment mode between active and inactive states based on a manipulation of the adjustment mode toggling feature.

56. The control device of claim 49, wherein the control device is further configured to output at least one of the first control signal and the second control signal only after manipulation of the associated at least one of the first control feature and the second control feature has ceased.

57. The control device of claim 49, wherein at least one of the first control feature and the second control feature is provided by the control device as a physical feature.

* * * * *